United States Patent [19]

Takanashi et al.

[11] Patent Number: 4,630,107
[45] Date of Patent: Dec. 16, 1986

[54] COLOR VIDEO SIGNAL PROCESSING DEVICE FOR ENHANCING AT LEAST ONE OF A PLURALITY OF PRIMARY COLOR SIGNAL COMPONENTS OUTPUT FROM A COLOR IMAGE PICKUP APPARATUS

[75] Inventors: Itsuo Takanashi, Yokohama; Shintaro Nakagaki, Fujisawa; Takashi Kuriyama, Tokyo, all of Japan

[73] Assignee: Victor Company of Japan, Limited, Kanagawa, Japan

[21] Appl. No.: 598,642

[22] Filed: Apr. 10, 1984

[30] Foreign Application Priority Data

Apr. 13, 1983 [JP] Japan ................... 58-65002

[51] Int. Cl.[4] ............ H04N 9/083; H04N 9/07; H04N 9/73
[52] U.S. Cl. .................... 358/47; 358/29; 358/44
[58] Field of Search .......... 358/43, 44, 47, 41, 358/29

[56] References Cited

U.S. PATENT DOCUMENTS

| | | | |
|---|---|---|---|
| 3,378,633 | 4/1968 | Macovski | 358/44 |
| 3,808,357 | 4/1974 | Nakagaki et al. | 358/47 |
| 3,846,579 | 11/1974 | Takanashi et al. | 358/47 |
| 4,041,528 | 8/1977 | Miyoshi et al. | 358/47 |

FOREIGN PATENT DOCUMENTS

| | | | |
|---|---|---|---|
| 50683 | 5/1981 | Japan | 358/47 |
| 50684 | 5/1981 | Japan | 358/47 |
| 19089 | 2/1983 | Japan | 358/43 |

Primary Examiner—James J. Groody
Assistant Examiner—Randall S. Svihla
Attorney, Agent, or Firm—Jordan and Hamburg

[57] ABSTRACT

A color video signal processing device for a color image pickup apparatus which allows the saturation of a particular primary color to be enhanced with a good S/N ratio and without affecting the other colors. The image pickup apparatus generates a multiplex color signal which is made up of a low frequency range signal containing all the three primary color signal components and a high frequency range carrier signal modulated with first and second primary color signal components, which are predetermined by the colors of a color stripe filter installed in the image pickup apparatus, and in turn these signals and processed and transformed generally to three primary color video signals and a luminance signal. The low frequency range and high frequency range signals are separated from the color multiplex signal. The separated high frequency range signal contains a fundamental component and a harmonic component. The fundamental component is subjected to envelope detection. The signal level of at least one of the separated low frequency range signal and the envelope-detected signal is adjusted such that a third primary color signal component absent in the high frequency range signal is introduced into a difference signal produced by subtraction of the envelope-detected signal and the low frequency range signal.

7 Claims, 23 Drawing Figures

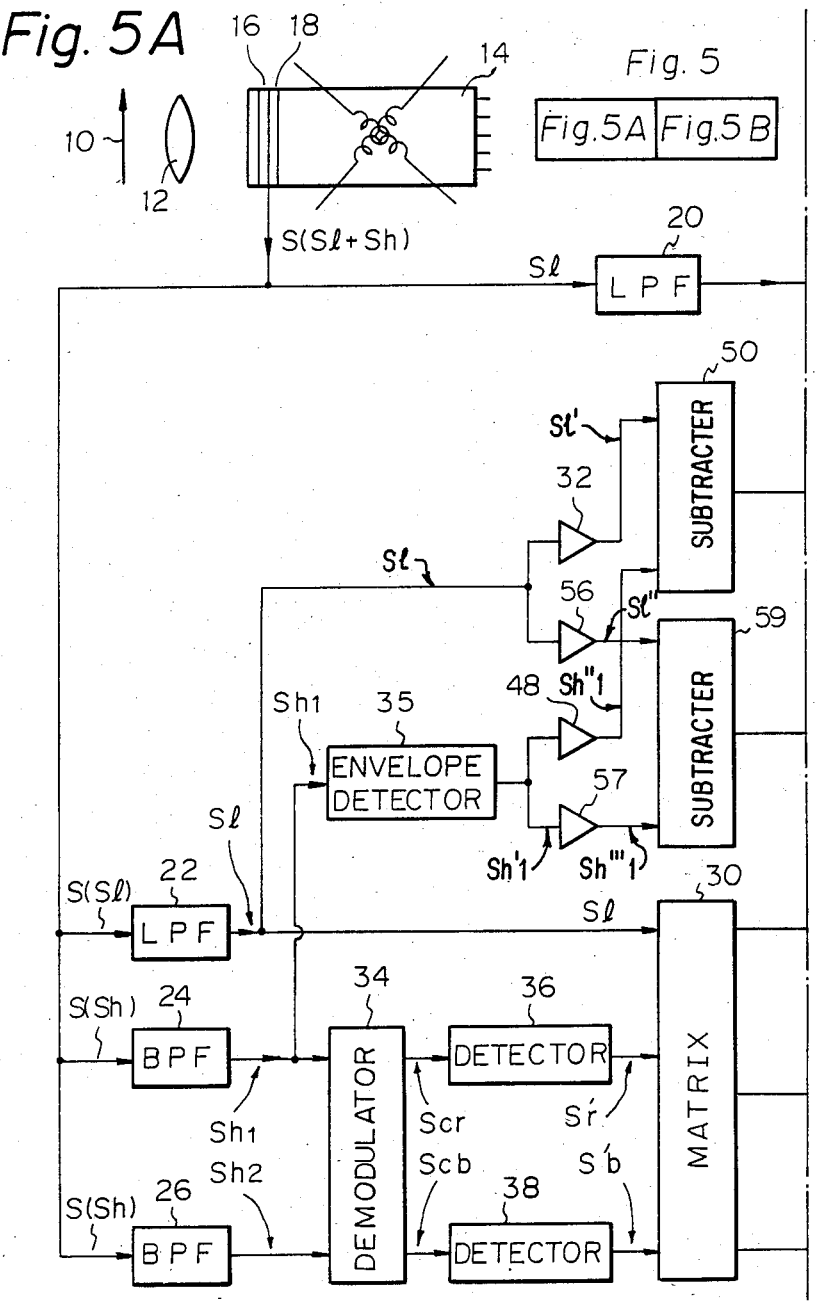

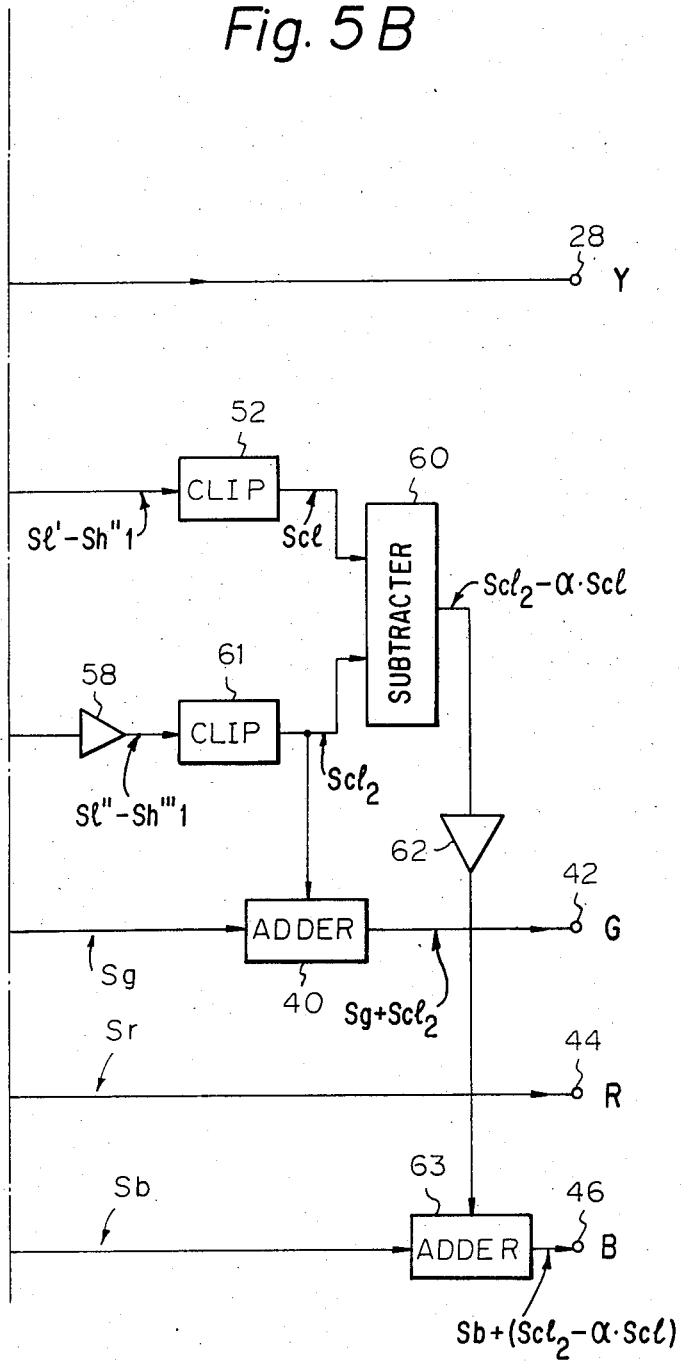

Sb

Sb+(Scℓ2−α·Scℓ)

Sg

Sg+Scℓ2

COLOR VIDEO SIGNAL PROCESSING DEVICE FOR ENHANCING AT LEAST ONE OF A PLURALITY OF PRIMARY COLOR SIGNAL COMPONENTS OUTPUT FROM A COLOR IMAGE PICKUP APPARATUS

BACKGROUND OF THE INVENTION

The present invention relates to a color image pickup apparatus for generating color television signals.

In a color television (TV) camera or like color TV signal generating apparatus, it sometimes occurs that the color video signal reproduces pictures in which the saturation of a particular primary color is insufficient. Various proposals have heretofore been made to solve such a problem. In a three-tube type color TV camera, for example, an attempt has been made to overcome shortage developed in the saturation of red by adding a difference {(red signal)−(green signal)} to a red signal R employing a predetermined polarity. In a single tube type color TV camera, it has been contemplated to process three primary color signals output from the camera so as to produce signal which varies the saturation of a particular color.

However, the first mentioned attempt associated with a three-tube TV camera is undesirable because it changes the saturation of magenta in addition to that of desired red, that is, a change in the saturation of one particular color is inevitably accompanied by a change in the saturation of another and unexpected color. The second-mentioned attempt, on the other hand, is not fully acceptable because the signal-to-noise (S/N) ratio of a signal generated by demodulating a multiplex color signal and processing it by a matrix circuit or the like is unavoidably deteriorated.

SUMMARY OF THE INVENTION

It is therefore an object of the present invention to provide a color video signal processing device for a color image pickup apparatus which is capable of enhancing the saturation of a particular primary color.

It is another object of the present invention to provide a color video signal processing device for a color image pickup apparatus which is capable of enhancing the saturation of a particular primary color without affecting the others.

It is another object of the present invention to provide a color video signal processing device for a color image pickup apparatus which is capable of enhancing the saturation of a particular color with a desirable S/N ratio.

It is another object of the present invention to provide a generally improved color video signal processing device for a color image pickup apparatus.

A color video signal processing device for enhancing at least one of color video signals output from a color image pickup apparatus of the present invention is of the type having a photoelectric transducer section and a color stripe filter and producing a multiplex color signal, said multiplex color signal including a low frequency range signal containing first, second and third primary color signal components of additive primary colors, and a high frequency range signal such that a carrier having a frequency dependent upon a pattern of arrangement of color stripes in the color stripe filter is amplitude-modulated by the first and second primary color signal components which are predetermined by colors of the color sripes constituting the color stripe filter. The high frequency range signal contains a fundamental component and a harmonic component. The processing device comprises a terminal for receiving the multiplex color signal, a first separating circuit connected to the terminal for separating the low frequency range signal out of the multiplex color signal, a second separating circuit connected to the terminal for separating the high frequency range signal out of the multiplex color signal, an envelope detector for detecting an envelope of the fundamental component of the high frequency range signal separated by the second separating circuit to generate an envelope detection output signal, a subtracter for generating a difference signal prepared by subtraction performed between the low frequency range signal separated by the first separating circuit and the envelope detection output signal from the envelope detector, a signal level setting circuit for respectively setting amplitudes of output signals from the first separating circuit and the envelope detector to predetermined values relative to each other such that when light incident to the color image pickup apparatus is a white light, the third primary color signal component contained in the difference signal from the subtracter which is absent in the high frequency range signal is generated with a predetermined polarity, a third circuit for selectively separating the third primary color signal component contained in the difference signal from the subtracter, and an adder for adding an output signal of the third separating circuit to the third primary color signal component of the low frequency range signal from the first separating circuit for enhancing the third primary color signal component in magnitude.

In accordance with the present invention, a color video signal processing device for a color image pickup apparatus is disclosed which allows the saturation of a particular primary color to be enhanced with a good S/N ratio without affecting the other colors. The image pickup apparatus generates a multiplex color signal which is made up of a low frequency range signal containing all the three primary color signal components and a high frequency range carrier signal modulated with first and second primary color signal components, which are predetermined by the colors of a color stripe filter installed in the image pickup apparatus, and in turn these signals are processed and transformed generally to three primary color video signals and a luminance signal. The low frequency range and high frequency range signals are separated from the color multiplex signal. The separated high frequency range signal contains a fundamental component and a harmonic component. The fundamental component is subjected to envelope detection. The signal level of at least one of the separated low frequency range signal and the envelope-detected signal is adjusted such that a third primary color signal component absent in the high frequency range signal is introduced into a difference signal produced by subtraction of the envelope-detected signal and the low frequency range signal.

The above and other objects, features and advantages of the present invention will become apparent from the following detailed description taken with the accompanying drawing.

BRIEF DESCRIPTION OF THE DRAWING

FIG. 5 constituted by FIGS. 5A and 5B is a block diagram for the second embodiment of the present invention.

DESCRIPTION OF THE PREFERRED EMBODIMENT

While the color video signal processing device for a color image pickup apparatus of the present invention is susceptible of numerous physical embodiments, depending upon the environment are requirements of use, a substantial number of the herein shown and described embodiment have been made, tested and used, and all have performed in an eminently satisfactory manner.

Figure 1:
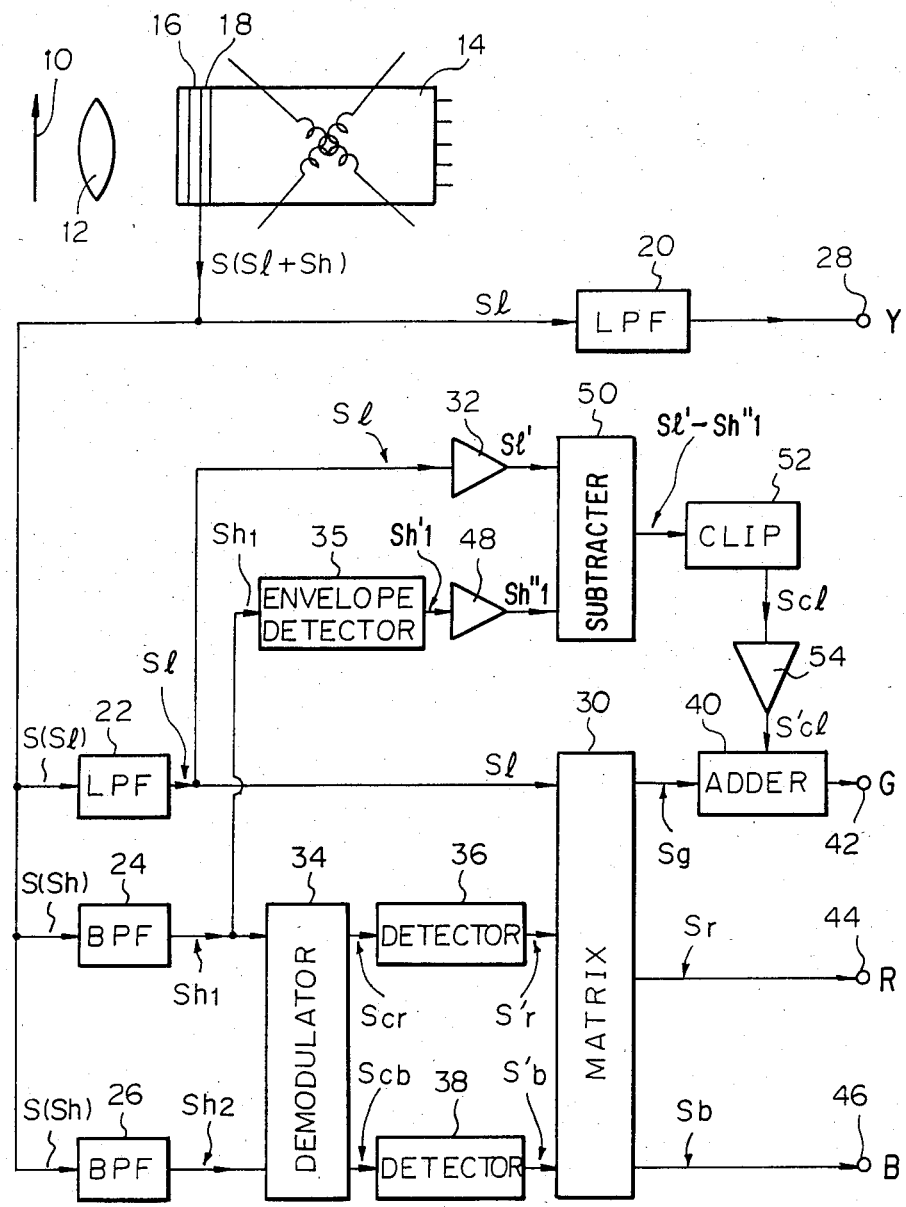
FIG. 1 is a block diagram of a color video signal processing device of the first embodiment for a color image pickup apparatus embodying the present invention which is applied to a color TV camera of the type employing a so-called step energy demodulation system.

Referring to FIG. 1 of the drawing, a color image pickup apparatus is shown which includes a lens 12, an image tube 14, a color stripe filter 16 mounted on the image tube 14, and a photoelectric transducer section 18. The transducer section 18 is contained in the image tube 14. When a light image of an object 10 is incident on the photoelectric transducer section 18 via the lens 12 and color stripe filter 16, the image tube 14 develops an output signal S which is a multiplex color signal made up of a low frequency range signal Sl and a high frequency range signal Sh. The low frequency range signal Sl, when the incident light is the full-color light contains all the signal components representative of three primary colors, i.e. first, second and third primary color signal components, in additive color mixture, while the high range signal Sh is in such a specific mode that a carrier whose frequency is dependent upon the pattern of color stripes arranged in the filter 16 has been amplitude-modulated by first and second primary color signal components, which are predetermined by the colors selected from the color stripes.

Figures 2A, 2B, 2C:
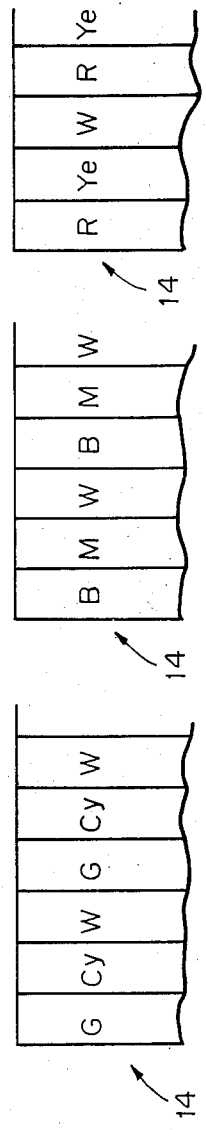
FIGS. 2A-2C are fragmentary enlarged plan views of examples of color stripe filters.

The color stripe filter 16 is disposed in the optical path which terminates at the transducer section 18 of the image tube 24 and may have any of the configurations shown in FIGS. 2A-2C. It should be noted that the filter configurations shown in FIGS. 2A-2C are only illustrative and other various configurations may be utilized. In these drawings, G represents color stripes which are transparent for green light, R color stripes transparent for red light, B color stripes transparent for blue light, Cy color stripes transparent for cyan light, M color stripes transparent for magenta light, Ye color stripes transparent for yellow light, and W color stripes transparent for full-color light.

Consisting of the low frequency range signal Sl and the high range signal Sh as previously described, the output signal S of the image tube 14 is expressed as:

$$S = Sl + Sh \quad (1)$$

Now, assume that the color stripe filter 16 located in the optical path as shown in FIG. 1 has the specific configuration shown in FIG. 2A which is made up of color stripes G transparent for green light, color stripes Cy transparent for cyan light, and color stripes W transparent for full-color light. Also, assume that the high frequency range signal Sh has a fundamental component Sh1 and a harmonic component Sh2. Then, the signals Sl, Sh1 and Sh2 respectively are produced as follows:

$$Sl = Sg + \tfrac{2}{3}Sb + \tfrac{1}{3}Sr \quad (2)$$

$$Sh1 = A \sin(\omega t + \phi) \quad (3)$$

$$Sh2 = (A/2) \sin(2\omega t - \phi) \quad (4)$$

where Sg, Sb and Sr represent primary color signals indicative of green, blue and red respectively. In the above Eqs. (3) and (4), $\phi$ and A are the following factors:

$$\phi = \tan^{-1}\{(Sb - Sr)/[\sqrt{3}(Sb + Sr)]\} \quad (5)$$

$$A = \frac{\sqrt{3}}{\pi}(Sb^2 + Sr^2 + SbSr)^{\frac{1}{2}} \quad (6)$$

Let it be assumed that a signal developed by the envelope detection of the fundamental component Sh1 in the high frequency range signal Sh represented by the Eq. (3) is Sh'1. This signal Sh'1 is expressed as:

$$Sh'1 = \frac{\sqrt{3}}{\pi}(Sb^2 + Sr^2 + SbSr)^{\frac{1}{2}} \quad (7)$$

When the incident light is full-color light, the envelope detection output Sh'1 produced by the Eq. (7) does not contain the green primary color signal Sg and contains only the primary color signal Sr indicative of red and the primary color signal Sb indicative of blue. Meanwhile, the low frequency range signal Sl in the Eq. (2) contains all the signal components Sg, Sr and Sb indicative of three primary colors in additive color mixture, green, red and blue. It is therefore possible to develop the primary color signal of green, which is absent in the envelope detection output Sh'1, by processing the low frequency range signal represented by the Eq. (2) and the envelope detection output Sh'1 represented by the Eq. (7).

Next, assume that the color stripe filter 16 in the optical path shown in FIG. 1 has the configuration shown in FIG. 2B which is made up of color stripes B transparent for blue light, color stripes M transparent for magenta light, and color stripes W transparent for full-color light. In this case, a blue primary color signal Sb which is absent in the envelope detection output Sh'1 may be developed by use of the low range signal Sl and the envelope detection output Sh'1. Further, where the filter 16 comprises color stripes R transparent for red light, color stripes Ye transparent for yellow light, and color stripes W transparent for full-color light, as shown in FIG. 2C, it is possible to produce a red primary color signal Sr absent in the envelope detection output Sh'1 by processing the signals Sl and Sh'1.

The description made so far has focused to a color image pickup apparatus of the type shown in FIG. 1 and employing so-called step energy demodulation described in the U.S. Pat. No. 4,041,528. It will be apparent to those skilled in this art that the present invention is also desirably applicable to another type of color image pickup apparatus in which, when the light incident on the apparatus is full-color light, a low frequency range signal of a multiplex color signal contains all the three primary color signal components while an envelope detection output developed by detecting an envelope of high frequency range signal contains only first and second primary color signals, inasmuch as an apparatus having such a construction is capable of developing a third primary color signal.

In the image pickup apparatus shown in FIG. 1, the output signal S of the image tube 14 is routed to low pass filters 20 and 22, bandpass filters 24 and 26, etc. The low pass filter 20 having a relatively wide band delivers to an output terminal 28 a luminance signal Y whose bandwidth is relatively wide. The other low pass filter 22 having a relatively narrow band develops a luminance signal Sl having a relatively narrow band which is then applied to a matrix circuit 30 and a level setting circuit 32.

The bandpass filter 24 extracts a fundamental harmonic component Sh1 out of the high frequency range carrier signal Sh and applies it to a demodulator 34 as well as to an envelope detector 35. The other bandpass filter 26 extracts a second harmonic component Sh2 out of the high frequency range carrier signal Sh and delivers it to the demodulator 34. Operating in a well known manner, the demodulator 34 develops a red signal Scr and a blue signal Scb each resembling a modulated carrier and applies them to detectors 36 and 38 respectively. The detectors 36 and 38 respectively detect the input signals Scr and Scb to produce signals S'r and S'b, which are commonly routed to the matrix circuit 30.

The matrix circuit 30 prepares three primary color signals Sg, Sr and Sb using the signal Sl output from the low pass filter 22, signals S'r and S'b output respectively from the detectors 36 and 38, etc. The green primary color signal Sg or G is fed to an output terminal 42 via an adder 40, the red primary color signal Sr or R is fed to an output terminal 44, and the blue primary color signal Sb or B is fed to an output terminal 46.

The signal Sh1 output from the bandpass filter 24 is detected by the envelope detector 35 the output Sh'1 of which is applied to a signal level setting circuit 48. A signal Sl' output from the signal level setting circuit 32 and a signal Sh"1 output from the signal level setting circuit 48 are respectively routed to a subtracter 50. In the illustrative embodiment, the signal levels of the two signals Sl' and Sh"1 applied to the subtracter 50 are individually adjusted by the independent level setting circuits 32 and 48. However, the gist of the apparatus of the present invention is that the relative magnitudes of the two signals Sl' and Sh"1 input to the subtracter 50 should only be held in a predetermined relation and, therefore, an arrangement may be made such that only one of the two signals Sl' and Sh"1 is processed by a signal level setting circuit.

Figure 3A:
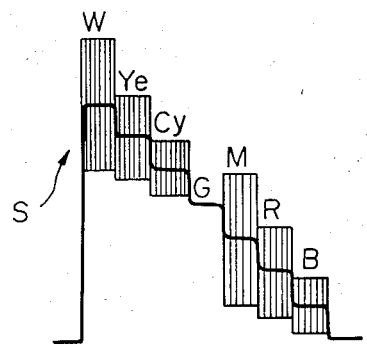
FIGS. 3A-3G are diagrams showing waveforms which appear in various portions of the device shown in FIG. 1.
Figure 3B:
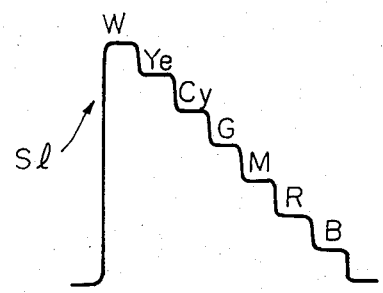
Figure 3C:
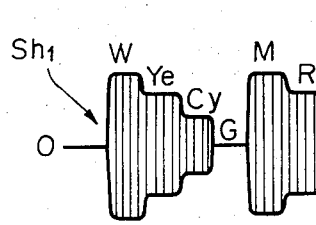
Figure 3D:
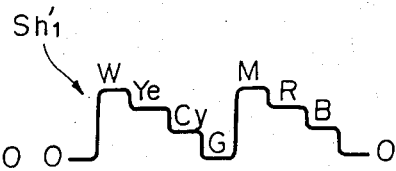
Figure 3E:
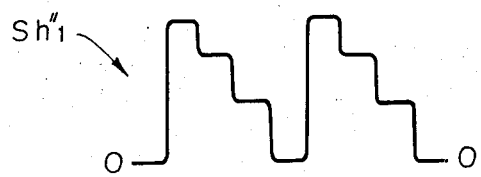
Figure 3F:
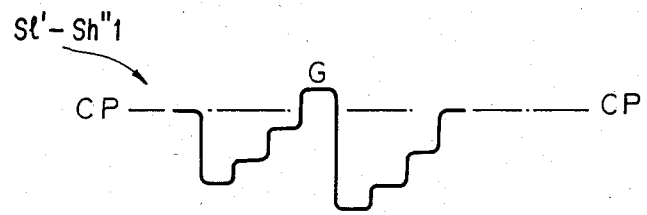

Referring to FIGS. 3A–3G, waveforms of signals which appear in various portions of the apparatus shown in FIG. 1 are illustrated. Among the illustrated waveforms, one shown in FIG. 3A represents the output signal S of the image tube 14, one shown in FIG. 3B the output signal of the low pass filter 22, one shown in FIG. 3C the output signal Sh1 of the bandpass filter 24, one shown in FIG. 3D the output signal Sh'1 of the envelope detector 35, one shown in FIG. 3E the output signal Sh"1 of the signal level setting circuit 48, one shown in FIG. 3F the output signal (Sl'−Sh"1) of the subtracter 50 where a green component is protruding, and one shown in FIG. 3G an output signal Scl of a clip circuit 52.

In accordance with the apparatus of the present invention, the signal level setting circuits 32 and 48 serve to adjust the relative magnitudes of the two signals Sl' and Sh"1 applied to the subtracter 50 so that a primary color signal absent in the high frequency range signal Sh but contained in the low frequency range signal Sl is regenerated in the output signal of the subtracter 50 with a predetermined polarity.

Figure 3G:
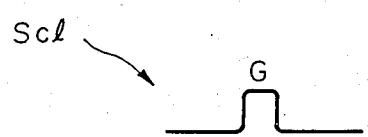

The signal (Sl'−Sh"1) output from the subtracter 50 is clipped by the clip circuit 52 at a predetermined clip level CP, thereby obtaining such a waveform as one shown in FIG. 3G. The signal Scl shown in FIG. 3G which is the output of the clip circuit 52 is a primary color signal indicative of pure green. The clipped signal Scl is applied to a gain control circuit 54 to have its magnitude controlled as desired. The output of the gain control circuit 54 is routed to the adder 40. The adder 40 adds, with a predetermined polarity, the signal S'cl output from the gain control 54 and the green primary color signal Sg fed from the matrix circuit 30 to the adder 40, the summation output appearing at an output terminal 42.

In practicing the present invention, the adjustment by the level setting circuits 32 and 48 may be elaborated to vary the relative magnitudes of the two signals Sl' and Sh"1 input to the subtracter 50 so that the signal S'cl fed to the adder 40 may be a combination of other primary components and the intended particular primary color signal, instead of the latter only. Such makes it possible to vary as desired even the saturation of the color which contains the particular primary color.

Figure 4:
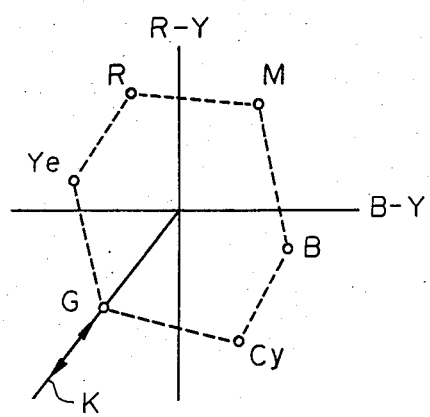
FIG. 4 is a vector diagram representing color ranges.

Referring to FIG. 4, exemplary color ranges in which the saturation is adjustable are shown in a vector diagram using axes R-Y and B-Y. Where the color video signal processing device in accordance with the present invention is operated by so predetermining the relative magnitudes of the two signals Sl' and Sh"1 to be applied to the subtracter 50 as to cause only a particular primary color signal to be output from the clip circuit 52, for example, the saturation of the aforementioned particular primary color (green in the illustrative example) will vary on a line K in FIG. 4 in response to the adjustment of the signal gain in the gain control 54.

Meanwhile, where the relative magnitudes of the two signals Sl' and Sh"1 are varied from the previously described one by the signal level adjustment assigned to the level setting circuits 32 and 48 so as to adjust the signal gain in the gain control 54, the saturation of the mixed colors containing the particular primary color (colors in the range between Ye and Cy including G in FIG. 4) will vary along the line traversing the line K in FIG. 4.

In the illustrative embodiment shown and described, the envelope detection output Sh"1 which is one of two signals applied to the subtracter 50 is produced by routing only the fundamental harmonic component Sh1 of the high frequency range signal Sh to the envelope detector 35. The exclusive use of the fundamental component Sh1 is advantageous for an envelope detection output Sh'1 having a desirable S/N ratio to be achieved with ease and, for this reason, the described manner of practicing the present invention is preferable.

Figure 6A:
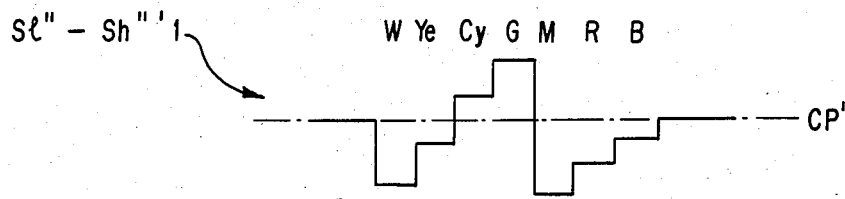
FIGS. 6A-6I are diagrams showing waveforms which appear in various portions of the device shown in FIGS. 5A and 5B.
Figure 6B:
Figure 6C:
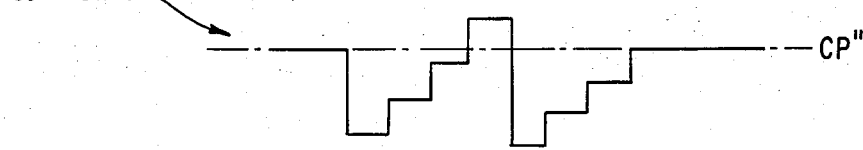
Figure 6D:
Figure 6E:
Figure 6F:
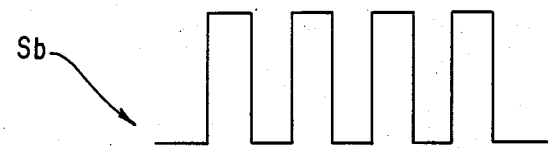
Figure 6G:
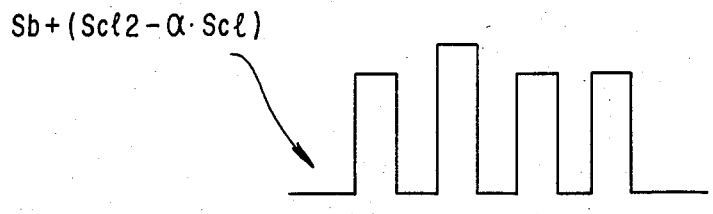
Figure 6H:
Figure 6I:
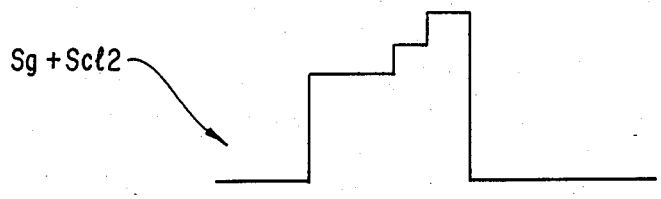

By providing additionally level setting circuits 56, 57 and 58, subtracters 59 and 60, clip circuit 61, a gain control circuit 62 and an adder 63 shown in FIGS. 5A and 5B, and adjusting the level setting circuits 56 and 58 so as to protrude cyan instead of green as shown in FIG. 3G, a cyan component in addition to the green component may be enhanced. In FIGS. 5A and 5B, the output signal Sh'1 output from the envelope detector 35 is applied to the level setting circuit 57, an output signal Sh'''1 of which is fed to the subtracter 59. The signal Sl from the bandpass filter 22 is applied to the level setting circuit 56, an output signal Sl'' of which is fed to the subtracter 59. An output signal from the subtracter 59 is applied to the level setting circuit 58 which produces an output signal (Sl''−Sh'''1) as shown in FIG. 6A. The chip circuit 61 clips the signal (Sl''−Sh'''1) at a predetermined clip level CP' (FIG. 6A) and then produces an output signal Scl2 which includes green and cyan components as shown in FIG. 6B. The signal Scl2 is applied to both the adder 40 and subtracter 60. An output signal (Sl'−Sh''1) from the subtracter 50, as shown in FIG. 6C, is applied to the clip circuit 52. The clip circuit 52 clips the signal (Sl'−Sh''1) at a predetermined clip level CP'' (FIG. 6C) and then produces an output signal Scl which includes a green component, as shown in FIG. 6D. The signal Scl is fed to the subtracter 60. In order that the green component in the signal Scl and the green component in the signal Scl2 are cancelled with each other, the subtracter 60 multiplies the signal Scl by a coefficient α and produces an output signal (Scl2−α·Scl) which includes a cyan component only, as shown in FIG. 6E. The signal (Scl2−α·Scl) is applied through the gain control circuit 62 to the adder 63 which then adds the signal Sb from the matrix circuit 30 shown in FIG. 6F to the signal (Scl2−α·Scl) and produces an output signal [Sb+(Scl2−α·Scl)] as shown in FIG. 6G. The signal Sg from the matrix circuit 30 and an output signal (Sg+Scl2) from the adder 40 are shown in FIGS. 6H and 6I, respectively.

In summary, it will be seen that the present invention provides a color video signal processing device for a color image pickup apparatus which is successful to enhances the saturation of a particular primary color signal with a favorable S/N ratio without affecting the other colors, thereby eliminating the various drawbacks inherent in the prior art apparatuses.

Various modifications will become possible for those skilled in the art after receiving the teachings of the present disclosure without departing from the scope thereof.

What is claimed is:

1. A color video signal processing device for enhancing at least one of a plurality of primary color signal components output from a color image pickup apparatus having a photoelectric transducer section and a color stripe filter and producing a multiplex color signal, said multiplex color signal including a low frequency range signal containing first, second and third primary color signal components corresponding to additive primary colors, and a high frequency range signal having a carrier with a frequency dependent upon a pattern of arrangement of color stripes in the color stripe filter, said carrier being amplitude-modulated by said first and second primary color signal components which are predetermined by colors of the color stripes constituting the color stripe filter, said high frequency range signal containing a fundamental component and a harmonic component, said processing device comprising:

terminal means for receiving the multiplex color signal;

first separating means connected to said terminal means for separating the low frequency range signal out of the multiplex color signal;

second separating means connected to said terminal means for separating the high frequency range signal out of the multiplex color signal;

envelope detector means for detecting an envelope of the fundamental component of the high frequency range signal separated by said second separating means and generating an envelope detection output signal;

subtractor means for generating a difference signal containing said third primary color signal component by subtracting the envelope detection output signal generated by said envelope detector means from the low frequency range signal separated by said first separating means;

signal level setting means for respectively setting levels of said low frequency range signal separated by said first separating means and said envelope detection output signal generated by said envelope detector means to predetermined levels relative to each other such that when white light is incident to the color image pickup apparatus, said third primary color signal component contained in the difference signal generated by the subtracter means which is absent in the high frequency range signal is generated by said subtracter means with a predetermined polarity and an enhanced amplitude;

third separating means for selectively separating the third primary color signal component contained in the difference signal generated by the subtracter means; and adder means for adding an output signal of said third separating means to the third primary color signal component contained in the low frequency range signal separated by said first separating means to enhance said third primary color signal component in amplitude.

2. A color video signal processing device as claimed in claim 1, in which the first separating means comprises a first low pass filter having a narrow bandwidth.

3. A color video signal processing device as claimed in claim 2, in which the first separating means further comprises a second low pass filter having a wide bandwidth connected to said terminal means to pass a luminance signal contained in said multiplex color signal.

4. A color video signal processing device as claimed in claim 2, in which the second separating means comprises a first bandpass filter connected to said terminal means for separating the fundamental component out of the high frequency range signal.

5. A color video signal processing device as claimed in claim 4, in which the second separating means further comprises a second bandpass filter connected to said terminal means for separating the harmonic component out of the high frequency range signal.

6. A color video signal processing device as claimed in claim 2, in which the signal level setting means comprises a first level setting circuit for setting a level of an output signal, corresponding to said low frequency range signal, of the first low pass filter having the narrow bandwidth and a second level setting circuit for setting a level of the envelope detection output signal generated by the envelope detector means.

7. A color video signal processing device as claimed in claim 1, further comprising level control means for adjusting a level of the output signal of the third separating means to a desired level.

* * * * *